United States Patent Office 3,235,743
Patented Feb. 15, 1966

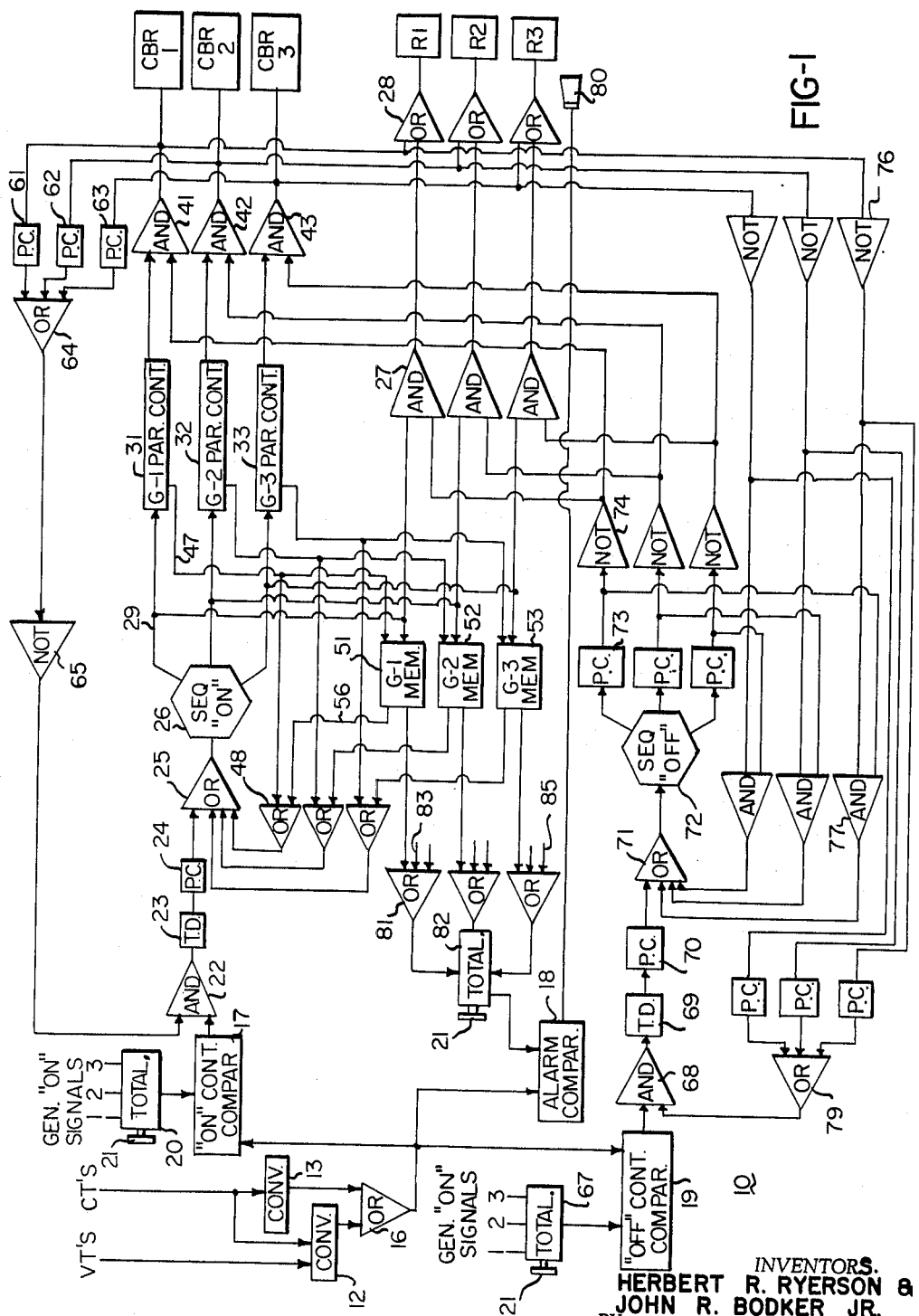

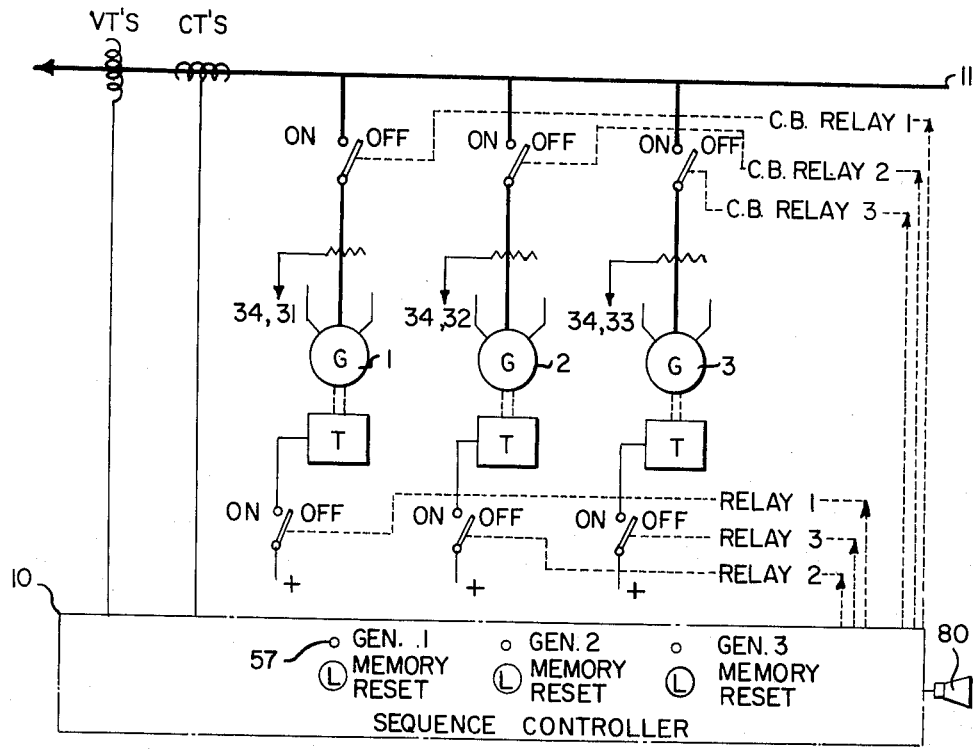
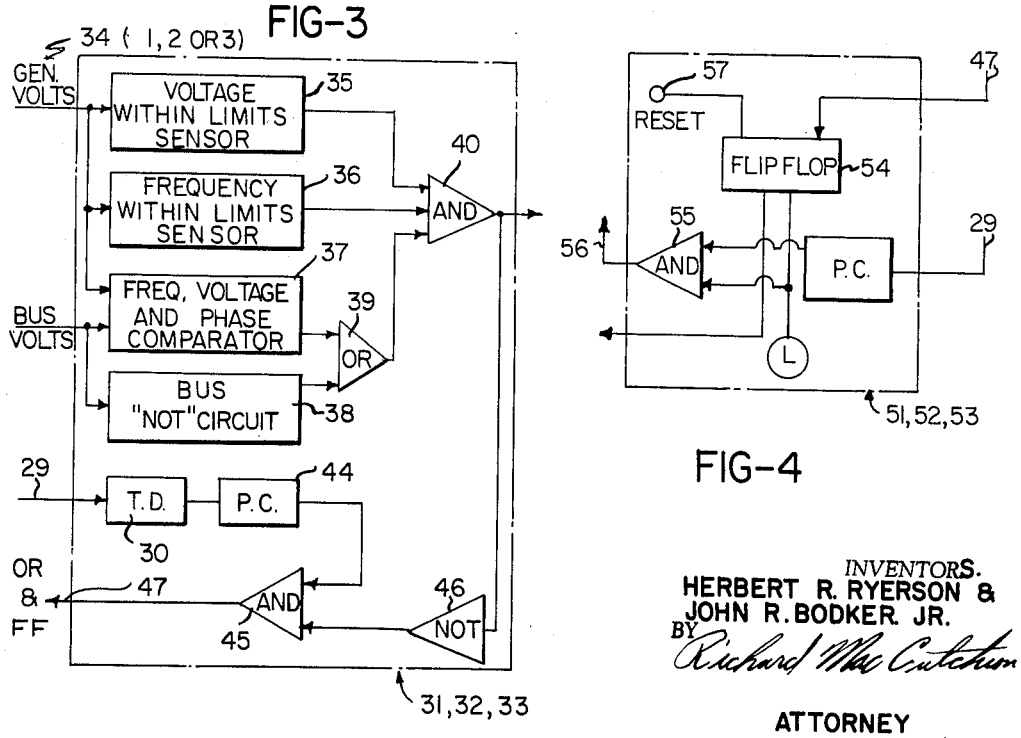

3,235,743
ELECTRIC CONTROL SYSTEM FOR SEQUENTIALLY ADDING OR REMOVING GENERATORS IN A POWER SYSTEM
Herbert R. Ryerson, Garfield Heights, and John R. Bodker, Jr., Independence, Ohio, assignors to Avtron Manufacturing, Inc., Cleveland, Ohio, a corporation of Ohio
Filed July 27, 1962, Ser. No. 212,906
6 Claims. (Cl. 290—30)

The present invention relates to improvements in electrical control systems and has significance, for example, in connection with a bus or system load responsive controller for sequentially starting, stopping, putting on the line, and taking off, respective ones of plural power sources.

In power stations for industrial plants and utilities and more recently, with the advent of more or less self contained power generating stations for large schools and commercial complexes, there has been a need for automation as a means of reducing operational costs but the need has been in large part unfulfilled due to the seeming difficulty of providing relatively low cost while completely reliable control equipment requiring no more than only occasional (e.g., once a week) human attention.

It is an object of the present invention to provide simple and inexpensive means for overcoming the above difficulty.

Another object is to provide a compact control system capable of providing any one and/or all of the functions hereinafter discussed.

Other objects and advantages will become apparent and the invention may be better understood from consideration of the following description taken in connection with the accompanying drawing, in which:

FIG. 1 is a one line and block diagram of a sequence controller 10 showing an embodiment of the invention;

FIG. 2 is a simplified diagram showing the controller 10 applied to operate plural turbine generator sets;

FIG. 3 is a detail indicating components in and signal flow through a "Paralleling Control" such as that indicated at 31 in FIG. 1; and FIG. 4 is a detail showing components and signal flow of a "Generator Memory" such as 51 of FIG. 1.

Referring now to the drawings, FIG. 1 is a one line schematic diagram showing a load responsive sequence controller indicated generally at 10 and being according to one aspect of the present invention. A specific example of use is shown in the one line diagram of FIG. 2 where controller 10 is applied to sequentially control the start (and stop) of respective turbine generator sets and the sequential switching of the respective generator on to and off of a load bus 11 as determined by the requirements of system load. Specifically, the controller shown is used to automatically start and connect generators 1, 2, 3 as load demand approaches rating of any of these generators already connected to the line 11. While three turbine generator sets are shown by way of example, the invention would be equally applicable were there four or five or more such sets, although many of the advantages of the control would be lost if there were only two such sets.

The invention has equal applicability whether the generators and bus are polyphase or single phase or D.C., but the three phase condition will be assumed for the purpose of description. While only a one line diagram is shown in FIGS. 1 and 2, plural instrument transformers are preferably used to provide for the plural phases as described below.

The entire controller 10 (see FIG. 1) can be solid state (transistorized). Although a few relays are shown, namely three circuit breaker relays CBR1-3 and three relays R1-R3 (which start and stop the respective turbine generator units and reset a control circuit to the respective generator fields if that feature is desired) even these relays could be solid state instead of electro-mechanical.

As seen in FIG. 1 voltage transformers and current transformers feed a power converter 12 and the CT's feed a current converter 13. These converters add the phases and convert to a D.C. signal, the power converter also multiplying the respective voltage, current and phase angle relationships to obtain a D.C. signal proportional to three phase load. Although converter 13 may be fed from two or three current transformers ("CT's," see one line diagram of FIG. 2) and the power converter 12 fed from these multiple current transformers and also responsive to multiphase voltages, if the bus (11 in FIG. 2) were D.C. one current shunt and one voltage divider would suffice and other "converters" would be unnecessary.

The current converter 13 provides a D.C. output voltage proportional to the multiplied R.M.S. values of all the phases of A.C. input, and the power converter 12 likewise produces D.C. signal corresponding to its total input, the three phase power converter for example having an output responsive to the sum of multiple multipliers and thus measuring total power correctly whether or not the phase voltages and currents are balanced. Signals from the power and current converters 12, 13 are passed through an OR gate circuit indicated in block form at 16 (FIG. 1) and from there to three difference detectors, comparators 17, 18, 19. The output of both the power converter 12 and the current converter 13 are compared in comparator 17 to a signal from a totalizer 20. As is well known a "totalizer" may comprise a simple network of plural resistors connected to provide an output signal across a dropping resistor, but since all of the parts shown in FIG. 1 (and those in FIGS. 3 and 4) are (or can be) standard items of manufacture and known to the art, their internal workings need not be described. We have found it preferable to have each totalizer (such as 20) be adjustable, as indicated by knob 21. The output of totalizer 20 increases in discrete steps as generators 1, 2 and/or 3 are added to the main bus. For the purpose of this discussion, it will be assumed that the totalizer is set so that the comparator 17 will operate when the total load on the system bus exceeds 95% of the rating of all of the generators then connected to the bus. Considering the output of the power converter and the current converter together, when the output of either exceeds the signal from totalizer 20, comparator 17 will provide an output signal which is passed through an AND circiut 22 and applied to a time delay circuit 23 where the signal starts the time delay, for example of one minute, the purpose of which is to prevent adding a generator for short term overloads. If the signal persists for the time delay the output of TD 23 is converted to a pulse at 24, passed through an OR circuit 25 and applied to a sequencer 26, which can be a transistorized ring counter.

The sequencer issues an ON signal to the next turbine in sequence. Assume a signal is issued to start turbine-generator #1. The output of the sequencer is passed through AND circuit 27, OR circuit 28, and applied as output to relay R1 which (see FIG. 2) opens a valve or does whatever is required to start the turbine from standstill, resets the generator field, etc.

The sequencer 26 also applies a signal through a line 29 to a time delay circuit 30 (see FIG. 3) in the paralleling control 31 for generator 1. When turbine #1 comes up to speed and is properly excited, voltage and frequency senors 35, 36 operate (at a pass signal if sensed quantities are within predetermined limits) in the paralleling control. When the phase voltage and frequency of the oncoming generator are proper with respect to bus, the frequency, voltage and phase comparator 37 will operate, but if the bus is not already energized, as by another generator, a bus NOT circuit 38 (a dead bus sensor) passes a signal through an OR circuit 39, AND circuit 40 (FIG. 3), AND circuit 41 (FIG. 1) to a circuit breaker relay CBR1, which issues a signal to connect generator #1 to the main bus 11. At the same time, the signal applied to relay CBR1 is also applied through OR 28 to relay R1 to latch it. The electrical latch prevents relay R1 from dropping out when the sequencer 26 advances to the next generator.

When the time delay circuit 30, FIG. 3, in the paralleling control times out, its output is converted to a pulse in pulse converter 44 and applied to AND circuit 45 also fed from a NOT circuit 46 from the output of AND 40. As is well known a "NOT" circuit converts a signal to no signal (and no signal to a signal) thus, under normal conditions the generator will be properly paralleled before the time delay circuit operates and therefore AND circuit 45 will block the pulse from 44. But if the generator does not parallel properly, the AND gate 45 will pass the time delay (30) output to line 47 and then through two OR circuits 48 and 25 and advance the sequencer 26 again. Thus, generator #1 will be skipped if it does not come up to speed and provide proper power within the length of time provided by time delay circuit 30 and control 31. With this condition, when the sequencer advances, the signal is removed from AND circuit 27 and therefore relay R1 will drop out stopping the turbine mechanically connected to generator #1. However, as mentioned previously, relay R1 will latch in if generator #1 is properly applied to the bus 11.

If a generator is skipped, it is desirable for the control to remember this fact and not try to start it the next time it comes up in the sequence. This is accomplished by generator memories 51, 52, 53, in FIG. 1. Each such generator memory is typically shown in more detail in FIG. 4 and operation of such a memory will now be described. When a pulse is issued by AND circuit 45 (FIG. 3) to line 47, the paralleling control has indicated that the particular generator (assuming #1) should be skipped and the pulse is also applied to a flip-flop circuit 54 in the generator #1 memory 51 (see FIG. 4). Typically the flip-flop circuit may be a multivibrator, and if desired when it is set by the signal through line 47 this may light "L" (one such light being provided for each memory unit so that an operator can tell at a glance which generator has been skipped). When the flip-flop 54 is set to light the light L it also provides a signal to an AND circuit 55. With the flip-flop in the SET condition, a signal from the sequencer to start turbine #1 will be passed through this AND circuit 55 to line 56, OR circuit 48, OR 25, to sequencer 26 advancing it to the next generator. The controller will not again attempt to start the turbine of generator #1 until the flip-flop is reset as by a button 57 (FIGS. 2 and 4). The proper light L on the front panel will also remain lighted until the flip-flop is reset.

As previously indicated, when a generator is added to the main bus, the output of totalizer 20 changes value. If the total number of generators on the bus are sufficient to carry the load, comparator 17 drops out. The cycle is repeated if the load increases sufficiently to require another generator.

However, if the addition of a single generator to the bus is not sufficient to carry the load, comparator 17 will not drop out. A special logic circuit is used to interrogate the comparator to determine if another generator is necessary. To this end, as shown at the upper right in FIG. 1 one of three pulse converters 61–63 will, when the generator is added to the bus, apply a pulse through an OR circuit 64 and a NOT circuit 65 to AND circuit 22. Thus the original pulse blocks AND gate 22 for a sufficient length of time to allow time delay circuit 23 to reset. At the end of the pulse, AND circuit 22 is no longer blocked. If the comparator is still providing an output, a cycle will be initiated to add another generator. Thus the system will keep adding generators until the comparator 17 drops out, indicating that the number of generators on the bus are sufficient to carry the load.

The procedure to remove a generator is analogous, although simpler. The output of the watt converter 12 and the current converter 13 is compared to the signal from a totalizer 67 by the comparator 19. This description is proceeding on the assumption that the totalizers are adjusted so that the controller will automatically start and connect another generator to the main bus when the load demand approaches approximately 95% of the total rating of the connected alternators, and will automatically drop a generator from the system when the total load demand of the system drops to 90% of the total rating of one less than the number of alternators connected to the system. The latter percentage is desirably less than the former to prevent the possibility of a cyclic condition occurring.

Referring again to FIG. 1, to initiate action to drop a generator the comparator 19 operates and provides a signal through an AND circuit 68, TD 69, PC 70, OR 71 to a sequencer 72. The time delay is provided to override load transients that might cause a false removal of a turbine. The sequencer is arranged to remove generators from the bus in the same order that they were applied to the bus. For purpose of description, assume generator #1 is to be removed. The output of the sequencer is converted to a pulse at 73, passed through NOT circuit 74 and "applied" to AND circuit 27, blocking it. In addition, the output of NOT circuit 74 is "applied" to AND gate 41, blocking it. When AND circuit 41 is blocked, relay CBR1 will drop out disconnecting generator #1 from the main bus. When AND circuit 27 and AND circuit 41 are both thus blocked, both inputs are removed from OR circuit 28 and relay R1 drops out, stopping turbine #1 but it should be noted that an electrical interlock is provided so that relay R1 cannot drop out until signal has been removed from relay CBR1.

In this sequence of dropping a generator, if a particular generator is not on the bus, it should be skipped and a disconnect signal issued to the next generator in the sequence. When generator #1 is connected to the bus, a signal is discouraged by a NOT circuit 76 which then blocks an AND circuit 77, blocking a pulse arriving from the sequencer 72. If generator #1 is not on the bus, however, AND circuit 77 is not blocked and the output of the sequencer passes through OR circuit 71 to the sequencer, advancing it to the next generator or, in actuality, until a generator is dropped.

When a generator is dropped from the main bus, the output of totalizer 67 changes value. Normally, comparator 19 then drops out and the unit is ready to start another cycle. If it is necessary to drop more than one generator, the comparator 19 will not drop out. In this case, OR circuit 79 interrogates comparator 19. Additional generators will be dropped in sequence until comparator 19 drops out.

The controller as shown in FIG. 1 performs another function. Whenever the load exceeds the rating of the total of all available generators that can be connected to the bus, an alarm signal is provided, for example through a relay (not shown) and a horn 80. Typically, if one generator is inoperative, an alarm signal will be issued if the load exceeds the rating of two generators. Assume that generator #1 is skipped. This sets the flip-flop (54 in FIG. 4) in generator #1 memory (51 in FIG. 1) furnishing a signal through OR circuit 81 to a totalizer 82. In this manner, totalizer 82 (which can have its own logic circuit, not shown) can be conformed in discrete steps according to the number of good generators. When the output of the power converter or the current converter exceeds that of totalizer 82, comparator 18 operates and provides an overload alarm signal. The three OR circuits, such as 81 are provided so that notice of high bearing temperature or other turbine or generator faults may also be indicated by the alarm system if desired (through spares 83, 85, etc.).

In operation some means (not shown) must be used to start a first turbine. Thereafter the "Dead Bus Sensor" can connect its generator to the bus. At the load on this generator reaches 95% of its rating, whether measured as current (to protect the generator) or as power (to protect the turbine), the condition is sensed, the proper sequencer actuated, and another turbine started. Although not previously mentioned, standard turbine speed controls may be assumed provided and generator voltage regulators may be assumed provided. When the added turbine generator comes up to speed and comes up to voltage the paralleling control is activated so that a "Close" signal is issued to the new unit's CBR while the start relay (R) for its turbine is electrically latched in.

Whether the system load then increases (to 95% of mating of the two generators combined) or decreases (to 90% of rating of one generator) the condition will be sensed by one or the other of the comparators (17, 19) and a proper signal given to (1) take care of the load, and (2) minimize wear and maximize efficiency by using minimum number of turbine generator sets at one time while equalizing their hours in operation.

If a turbine generator does not start properly, it will be shut down and the next generator in sequence (or the alarm) will be started, and until reset the memory will remember the failure to start and not try to start the same unit again.

There is thus provided apparatus of the class described capable of meeting the objects above set forth, automatically providing controlling signals in a sequence determined by remote occurrences but with plural "reasonable times" imposed on the control, in the specific example one such time in order to prevent start-up for short term overloads, another (for each generator) to allow a preset time to become paralleled, yet another to take care of short term transients which should not be allowed to "under-power" the system.

While it has been mentioned that substantially the entire control can be transistorized, and this does have advantages of economy, reliability and compactness, according to a broad aspect of the invention vacuum tubes could be used instead of transistors, or electro-mechanical relays, magnetic amplifiers, or other devices might be used in place of either transistors or tubes, and it should be understood that the lines and blocks in the drawing FIGS. 1, 3 and 4 do not indicate wires and devices, but, rather, signal flow and functions. Two or three or more functions might be performed by a single device, such as a relay whose back contacts complete a NOT circuit and whose normally open contacts in series (or parallel) with those of one or more other relays complete an AND (or OR) circuit while the same relay could have its own built-in provision for imposing a time delay between energization of its coil and actuation of its contacts.

Thus, while we have illustrated a specific embodiment, numerous modifications may obviously be made by those skilled in the art without departing from the true spirit and scope of the invention which we intend to have defined only by the appended claims taken with all reasonable equivalents.

We claim:

1. In a system including controlled devices which are engine-generator combinations to be applied and removed by discrete steps as determined by system load, the combination of
   (a) source of control power,
   (b) separate signal producing means respectively associated one with each of said controlled devices, each producing a signal for one condition of the associate device,
   (c) a signal totalizing means arranged to be fed from a plurality of "b" signal producing means when activated,
   (d) means including a system current transducer and a system wattage transducer and an "OR" gate connected responsive to said transducers for producing a signal indicative of criticality of signal from either of said transducers,
   (e) a difference detector arranged to compare the difference of signals from "c" and "d,"
   (f) a sequencer operable responsive to a signal emanating from difference detector "e" and connected to change the condition of a different one of the controlled devices with each sequence of the same function indicating signal arriving from difference detector.

2. In a system including controlled devices which are engine-generator combinations to be applied and removed by discrete steps as determined by system load, the combination of
   (a) a source of control power,
   (b) separate signal producing means respectively associated one with each of said controlled devices, each producing a signal for one condition of the associate device,
   (c) a signal totalizing means arranged to be fed from a plurality of "b" signal producing means when activated,
   (d) means including a system current transducer and a system wattage transducer and an "OR" gate connected responsive to said transducers for producing a signal indicative of criticality of signal from either of said transducers,
   (e) a difference detector arranged to compare the difference of signals from "c" and "d,"
   (e') a time delay means arranged to pass a function indicating signal only when signal from difference detector "e" persists for a predetermined period of time, and
   (f) a sequencer operable responsive to a signal through said time delay means to change the condition of a different one of the controlled devices with each sequence of said function indicating signal arriving from said time delay device.

3. Plural combinations each comprising the $a$, $b$, $c$, $d$, $e$ and $f$ combination of claim 1, each of said combinations being separately adjustable and one of them being normally adjusted to apply a controlled device when system load exceeds a predetermined percentage of rating of all controlled devices then applied, and the other of them being normally adjusted to remove a controlled device when system load drops below a predetermined percentage of rating of one less than number of controlled devices then applied, the controlled devices being components of prime-mover-generator sets, the last mentioned predetermined percentage being of lesser value than the first mentioned predetermined percentage.

4. The combination of claim 1 further characterized by
   (g) the controlled devices being generators and turbines respectively arranged to drive said generators,
   (h) connections from the sequencer comprising plural first circuits from the sequencer to sequentially start the respective turbines and pural second circuits each associated with a different one of the first circuits and for switching the associate generator to feed the system load when said generator's turbine has become operative.

5. The combination of claim 1 further characterized by
   (g) connections from the "f" sequencer with said connections comprising
   (h) plural first circuits from the sequencer to sequentially start the respective engines,
   (i) said connections from the "f" sequencer also comprising plural second circuits each associated with a different one of the first circuits and for switching the associate generator to feed the system load when said generator's engine has become operative, and (j) plural paralleling controlling systems interposed one in each of said second circuits, with each of said paralleling control systems including j(a) voltage anad frequency sensors, j(b) a dead bus sensor, and j(c) gate means connected to insure that the associate generator will be connected to the load only when appropriate conditions exist.

6. The combination of claim 5 further characterized by a generator memory circuit which includes a bistable device which is actuated to one stable condition when a generator will not parallel within a predetermined time so that the sequencer will not again try to apply that engine generator unit until the bistable device is reset.

References Cited by the Examiner

UNITED STATES PATENTS

| | | | |
|---|---|---|---|
| 1,764,332 | 6/1930 | Moss et al. | 307—81 |
| 1,783,935 | 12/1930 | Hommel | 290—30 |

ORIS L. RADER, *Primary Examiner.*